United States Patent
Hui et al.

(10) Patent No.: US 6,868,091 B1
(45) Date of Patent: Mar. 15, 2005

(54) APPARATUS AND METHOD FOR DEPACKETIZING AND ALIGNING PACKETIZED INPUT DATA

(75) Inventors: Yau Wei Lucas Hui, Singapore (SG); Jean Louis Laborie, Saint Egréve (FR); Gaël Lassure, Grisy Suisnes (FR)

(73) Assignee: STMicroelectronics Asia Pacific Pte. Ltd., Singapore (SG)

( * ) Notice: Subject to any disclaimer, the term of this patent is extended or adjusted under 35 U.S.C. 154(b) by 0 days.

(21) Appl. No.: 09/530,465
(22) PCT Filed: Oct. 31, 1997
(86) PCT No.: PCT/SG97/00055
§ 371 (c)(1), (2), (4) Date: Jul. 13, 2000
(87) PCT Pub. No.: WO99/23776
PCT Pub. Date: May 14, 1999

(51) Int. Cl.[7] .................................................. H04J 3/00
(52) U.S. Cl. ........................................................ 370/476
(58) Field of Search ................................ 370/389, 392, 370/394, 470, 472, 474, 476, 473, 471

(56) References Cited

U.S. PATENT DOCUMENTS

| | | | | |
|---|---|---|---|---|
| 5,410,355 A | * | 4/1995 | Kolczynski | 375/240.01 |
| 5,452,006 A | * | 9/1995 | Auld | 375/240.26 |
| 5,638,367 A | * | 6/1997 | Gaytan et al. | 370/471 |
| 5,777,992 A | * | 7/1998 | Lokhoff | 370/389 |
| 5,850,258 A | * | 12/1998 | Kang | 375/240.01 |
| 5,893,066 A | * | 4/1999 | Hong | 704/500 |
| 5,963,596 A | * | 10/1999 | Benbassat et al. | 375/243 |
| 6,233,253 B1 | * | 5/2001 | Settle et al. | 370/474 |
| 6,310,652 B1 | * | 10/2001 | Li et al. | 348/515 |
| 6,442,163 B1 | * | 8/2002 | Chopping | 370/395.1 |

* cited by examiner

*Primary Examiner*—Chi Pham
*Assistant Examiner*—Anh-Vu H. Ly
(74) *Attorney, Agent, or Firm*—Lisa K. Jorgensen; E. Russell Tarleton; Seed IP Law Group PLLC (57) ABSTRACT

Apparatus for depacketizing and aligning packetized input data. Data processing means receives the input data via an input memory and detects, identifies and determines payload size of a data packet of the input data. The data processing means generates a payload size signal indicative of the size of the payload. A word formatter receives units of the payload from the input memory and gathers and aligns these to form data words. A payload counter controls flow of input data from the input memory to the word formatter in accordance with the payload size signal. An input buffer receives the data words from the word formatter, stores these and transfers them to the data processing means for effecting data processing.

23 Claims, 5 Drawing Sheets

APPARATUS AND METHOD FOR DEPACKETIZING AND ALIGNING PACKETIZED INPUT DATA

DETAILED DESCRIPTION OF THE INVENTION (1) Field of the Invention

This invention relates to apparatus and method for de-packetizing and aligning packetized input data.

(2) Prior Art

In data retrieval or communication systems, digital data or digitized multimedia information which can be, potentially, large or variable in size is normally packetized before storage or transmission. This process breaks the data into smaller packets where each packet contains one or more detectable synchronization patterns called sync-word, necessary information about the packet, and a payload of a smaller partition of the original data. The information about the packet may consist of a packet identification (ID), size of the payload contained in the current packet, timing information, and any necessary side information.

In applications where there could be multiple sources of data, for example shared data network or multimedia audio/visual information for local data storage device, each source of data is packetized and the resulting packets from all sources are interleaved before transmission or storage. The packet ID is used to identify the data source of each packet. Timing information, which may be in the form of time stamps or temporal references, is used for ordering of the packets or for synchronization between each data source for transmission or presentation.

Information related to both multimedia audio and video data is often very large in size, and therefore data compression techniques such as MPEG video and audio compression techniques are usually applied before packetization. Packetization in this case may also follow the method as specified by the MPEG Systems specifications.

With respect to data retrieving operations, packets received from a communication system or read from local storage are required to be de-packetized before processing by each respective data processor. The de-packetization process includes, first, detection of the sync-word, followed by verification of the packet ID, extraction of timing and necessary side information, determining the payload size and, finally, extraction and concatenation of the payload to reconstruct the data. The de-packetized data may be passed to a data processor for further processing. For example, the data processor for MPEG compressed audio data will be a corresponding MPEG audio decoder; furthermore, this audio decoder may be implemented using programmable DSP (Digital Signal Processor).

Figure 1:
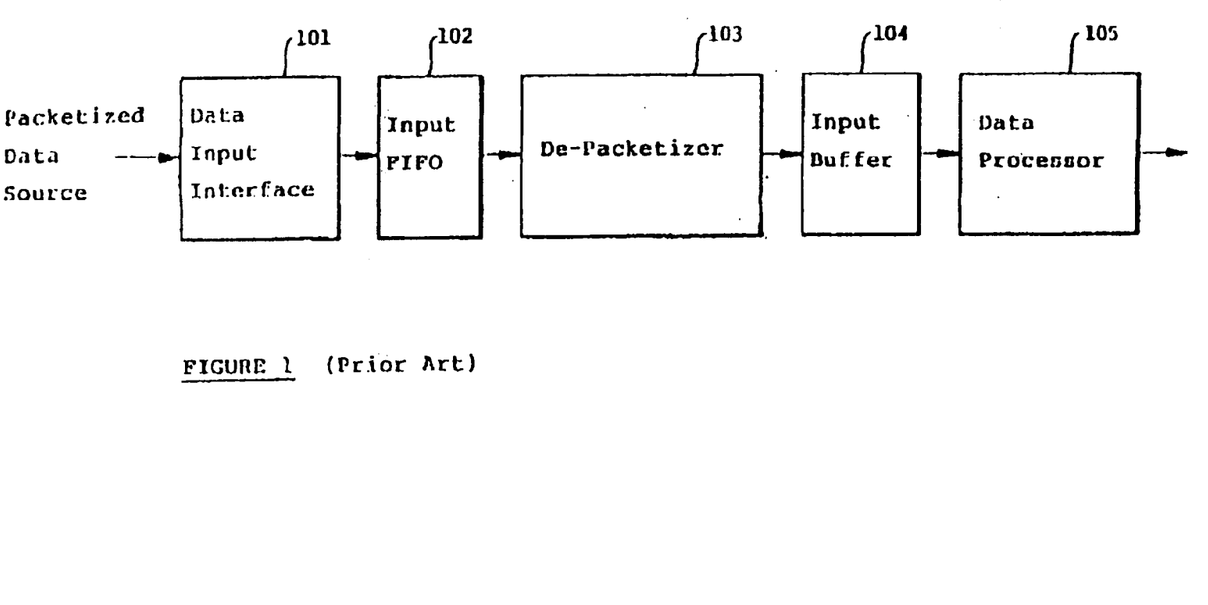
FIG. 1 is a block diagram of a prior art system for de-packetizing and processing data.

FIG. 1 illustrates a block diagram of a prior art system. Packetized data is received via a data input interface 101, where hand shaking with the packetized data source is performed, and also, if necessary, serial-to-parallel conversion is effected. The received packetized data is processed by a De-packetizer 103. In order to handle possible jitters in overall transmission rate of the packetized data source and the processing speed of the de-packetizer, an Input FIFO (first-in-first-out memory) 102 is inserted in between the data input interface 101 and the de-packetizer 103. The de-packetizer 103 can be a dedicated and fixed function hardware or a programmable processor performing the de-packetization process, as described, to produce the de-packetized data. The de-packetized data is placed into an Input Buffer 104 before being read by Data Processor 105.

The size of the Input Buffer 104 is determined by the nature and type of the data involved, the processing bandwidth of the data processor 105 and, possibly, synchronization requirements of other processes outside the system. For example, it may serve as a delay buffer for synchronization of an audio data stream to an external video data stream, or a temporal storage buffer such that it can feed regularly to a high speed data processor a block of data, at a rate higher that the input rate.

Figure 2:
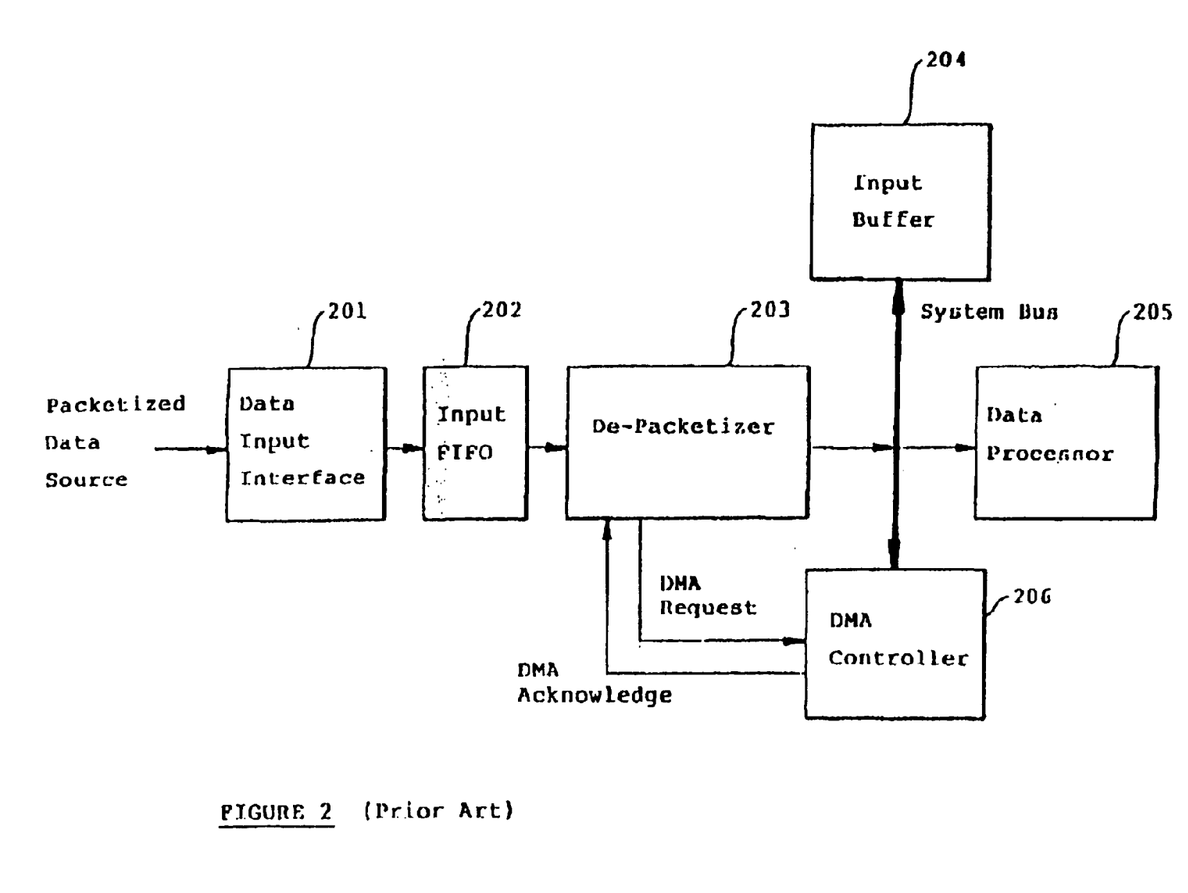
FIG. 2 is a block diagram of a conventional circuit for de-packetizing and processing data.

In FIG. 2, a block diagram of another prior art system prior art is illustrated. In order to reduce overall system cost and improve performance of the data processor, single port system RAM (random access memory) coupling to the system bus of the data processor 205 serves as the Input Buffer 204, and a DMA Controller (direct memory access controller) 206 is normally used for transferring the de-packetized data from the de-packetizer 203 to the input buffer 204 via the system bus. The Input Buffer 204 may be optimized in size by using a circular buffer technique.

It is likely that the system RAM and the input data (packetized or de-packetized) do not share the same word format in terms of number of bit resolution. For example, the MPEG systems data is byte aligned and most DSP systems (system bus, system RAM, etc.) use sixteen or more bits per word for performance reasons. It is a task for the de-packetizer 203 to align the de-packetized data to the word format required by the data processor before outputting it to the Input Buffer 204, since this input buffer belongs also to part of the data processor system RAM.

In most systems implementations, flexibility in the De-Packetizer is required, for handling variations in the decoding of the sync-word, ID, timing and necessary side information in each packet; hence, a programmable processor core is very suitable for these jobs. On the other hand, the De-Packetizer is also required to perform simple but highly repetitive tasks of reading payload from the data input interface, aligning the de-packetized data to the data processor word format, and moving the de-packetized and aligned data to the input buffer. A programmable processor core, is highly inefficient for such simple but highly repetitive tasks as it takes up a high percentage of the processing cycles.

A large FIFO may also be required as buffer memory in between the Data Input Interface and the De-Packetizer, due to the requirements of flexibility in the de-packetization process and inefficiencies of a programmable processor core for simple and highly repetitive tasks. Furthermore, additional memory must be associated with the programmable processor core for storing and processing of the necessary side information of the packets.

SUMMARY OF THE INVENTION

It is an object of the current invention to provide an improved apparatus and method for de-packetizating and aligning packetized input data.

In one aspect, the invention provides apparatus for depacketizing and aligning packetized input data, having:

an input memory for receiving storing, and output of the input data, and for outputting of units of a payload of a data packet of the input data;

data processing means for receiving the outputted input data from the input memory and detecting, identifying and determining payload size of the data packet and generating a payload size signal indicative of the size of the payload, and for separately receiving and effecting data processing of the payload;

a word formatter for receiving said units of said payload outputted from the input memory, gathering and aligning said units to form data words, and outputting said words;

a payload counter for controlling the input memory in accordance with the payload size signal whereby to cause the payload units to be outputted from the input memory to the word formatter; and an input buffer for receiving said data words from the word formatter and storing these, and for transferring the data words to the data processing means, to effect said separate receiving of said payload;

said data processing means for effecting said data processing using the received said data words.

The apparatus may have a data input interface through which the input data is transferred to the input memory, said data input interface for performing hand shaking with a packetized data source of said input data.

The input memory may have a fullness level detector for generating a level filled signal when the input data received thereby is such as to fill the input memory to a predetermined level, and said data processing means may be responsive to generation of said level filled signal to execute said receiving the outputted input data from the input memory and detecting, identifying and determining payload size of the data packet and generating said payload size signal.

An interrupt controller may be provided for receiving said level filled signal and generating an interrupt signal pursuant to receipt thereof, said data processing means being arranged for receipt of said interrupt signal and, on receipt thereof, for executing said receiving the outputted input data from the input memory and detecting, identifying and determining payload size of the data packet therein and generating said payload size signal.

The input memory may have a further fullness level detector for generating and directing to said data input interface a further level filled signal when the input thereto of fresh input data is such as to fill the input memory to a further predetermined level, said data input interface being responsive to receipt of said further level filled signal to generate a data request signal for direction to said packetized data source, indicative of a need to modify the data transmission rate of the input data directed to the apparatus from the packetized data source.

The input memory may be controlled whereby said input data comprising said packet is removed from the input memory and relaced by fresh input data, pursuant to the transfer to the data processing means of said words representing the data packet to the data the apparatus being arranged for repetitive depacketizing and aligning of data packets and data processing thereof, the data processing means being arranged for repetitively and alternatingly executing a step comprising said receiving the outputted input data from the input memory and detecting, identifying and determining payload size of the data packet therein and generating said payload size signal, and a step comprising said separately receiving and effecting data processing of the payload of the data packet.

The data processing means may include a digital signal processor, data/program memory, DMA controller and input buffer, each in data communication via a bus.

The word formatter may be arranged for generating a DMA request signal when a said data word is formed thereby, and the DMA controller is responsive to said DMA request signal to generate and direct a transfer signal to the digital signal processor, the digital signal processor being responsive to the transfer signal to enable the DMA controller to move the data word from the word formatter to the input buffer for subsequent processing.

The input memory may comprise a first in first out memory.

The data processing means may be arranged to execute said detecting and identifying the data packet by detection of a sync-word, followed by verification of the packet ID.

The data processing means may, pursuant to said detecting and identifying the data packet, extract timing information from the input data.

The data processing means may, pursuant to said detecting and identifying the data packet, extract side information from the input data.

The invention also provides a method for depacketizing and aligning packetized input data comprising:

receiving and storing the input data in an input memory;

outputting the stored input data to data processing means;

by use of the data processing means, detecting, identifying and determining the size of a payload of a data packet of the input data outputted thereto;

by use of the data processing means, generating a payload size signal indicative of the size of the payload;

controlling the input memory in accordance with the payload size signal whereby to cause payload units which form said payload to be outputted from the input memory to the word formatter;

by use of said word formatter, gathering and aligning said payload units outputted thereto to form data words;

outputting said data words from said word formatter to an input buffer and storing these in said input buffer;

transferring said data words to the data processing means; and effecting data processing on the data packet represented by the data words transferred thereto, using the transferred data words.

The input data may be transferred to the input memory via an data input interface which performs hand shaking with a packetized data source of said input data.

The method may include the step of generating a level filled signal when the input data received by the input memory is such as to fill the input memory to a predetermined level, and causing said data processing means to effect said detecting, identifying and determining payload size of the data packet, and to said generate payload size signal, pursuant to generation of the level filled signal.

The method may include the step of generating an interrupt signal from said level filled signal and directing said interrupt signal to said data processing means to cause said data processing means to effect said receiving the outputted input data from the input memory and detecting, identifying and determining payload size of the data packet therein and to generate said payload size signal.

The method may include the step of generating and directing to said data input interface a further level filled signal when the input thereto of fresh input data is such as to fill the input memory to a further predetermined level, and causing said data input interface to generate, responsive to receipt thereby of said further level filled signal, a data request signal for direction to said packetized data source, indicative of a need to modify the data transmission rate of the input data directed to the apparatus from the packetized data source, The input memory may be controlled whereby said input data comprising a said packet is removed from the input memory and relaced by fresh input data pursuant to the transfer of said words representing that data packet to the data processor. A step comprising said receiving the outputted input data from the input memory and detecting, identifying and determining payload size of the data packet therein and generating said payload size signal indicative of the size of the payload, and a step comprising effecting data processing of the payload may be repetitively and alternatingly executed.

A DMA request signal may be generated when a said word is formed, and applying the DMA request signal to a digital signal processor forming part of said data processing means to cause the digital signal processor to enable a DMA controller to move that data word from the word formatter to an input buffer of the data processor for subsequent processing.

The data processing means may execute said detecting and identifying the data packet by detection of a sync-word, followed by verification of the packet ID.

The invention also provides apparatus for depacketizing and aligning packetized input data, having:

an input memory for receiving storing, and output of the input data, and for outputting of units of a payload of a data packet of the input data;

data processing means for receiving the outputted input data from the input memory and detecting, identifying and determining payload size of the data packet and generating a payload size signal indicative of the size of the payload, and for separately receiving and effecting data processing of the payload;

a word formatter for receiving said units of said payload outputted from the input memory, gathering and aligning said units to form data words, and outputting said words;

a payload counter for controlling the input memory in accordance with the payload size signal whereby to cause the payload units to be outputted from the input memory to the word formatter; and means for transferring the data words to the data processing means, to effect said separate receiving of the data packet, when the stored data words complete said payload.

The invention also provides a method for depacketizing and aligning packetized input data comprising:

receiving and storing the input data in an input memory;

outputting the stored input data to data processing means;

by use of the data processing means, detecting, identifying and determining the size of a payload of a data packet of the input data outputted thereto;

by use of the data processing means, generating a payload size signal indicative of the size of the payload;

controlling the input memory in accordance with the payload size signal whereby to cause payload units which form said payload to be outputted from the input memory to the word formatter;

by use of said word formatter, gathering and aligning said payload units outputted thereto to form data words;

outputting said data words from said word formatter to an input buffer and storing these in said input buffer;

transferring said data words to the data processing means.

In a particular form of the invention, a single programmable processor core is used as the Data Processor of the system for processing of the de-packetized data; the detection of sync-word, decoding of the packet ID, payload size, timing and necessary side information of the data packet which take up only little processing cycles are instead performed by the same Data Processor in software to provide the necessary flexibility. The De-Packetizer hardware can be simplified to an implementation with only the Payload Counter which controls size of payload transferred and the Word Formatter to align the payload data to the Data Processor word format.

By combining the functions of the De-Packetizer which may require flexibility and the data processor implementation on the same programmable processor core, overall system complexity and cost can be minimized; furthermore, the use of a programmable processor core provides maximum flexibility to the De-Packetizer functions. On the other hand, the Payload counter and Word Formatter can take care of simple but repetitive tasks in such a way that overall system performance may be significantly enhanced with minimal implementation cost.

DETAILED DESCRIPTION

Figure 3:
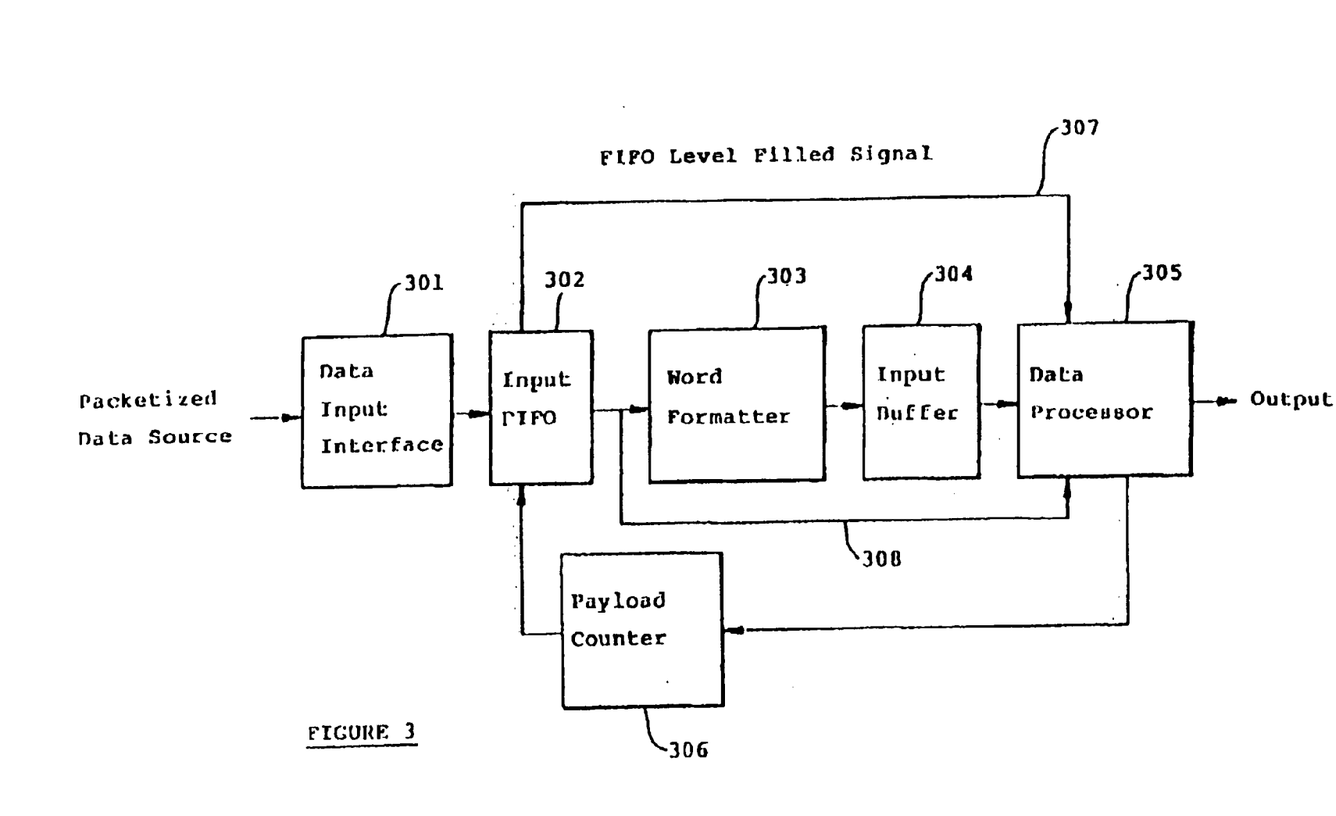
FIG. 3 is a block diagram of an embodiment of a device for practicing the present invention.

Referring to FIG. 3, Packetized data is input via the data input interface 301 to an input memory formed as an Input FIFO 302. When the Input FIFO 302 is filled to a predetermined level, data processing means in the form of a Data Processor 305 is signalled by FIFO Level Filled Signal 307, and packetized data is read from the Input FIFO 302 by the Data Processor 305 via path 308.

The Data Processor 305 scans the read packetized data for sync-word detection, ID checking, payload size, timing and necessary side information decoding. When a valid packet is detected (by checking the sync-word and ID) and its payload size, timing and necessary side information decoded, the Data Processor stops reading packetized data directly from the Input FIFO 302, sets the Payload Counter 306 with the decoded payload size value, and returns to its normal data processing functions.

When the Payload Counter value is set, it starts loading the Word Formatter 303 with the payload. The Payload Counter counts as each unit of the payload is being transferred from the input FIFO 302 to the Word Formatter 303. The Word Formatter 303 gathers and aligns the received payload units according to the data processor word format. After a complete data word is formed in the Word Formatter 303, the data word is transferred to the Input Buffer 304. The Payload Counter 306 stops outputting of the payload from the Input FIFO 302 to the Word Formatter 303 after it has transferred the full payload size for the current packet. The Input FIFO 302 is then filled with the input packetized data, and the whole process is repeated again.

When the Input Buffer 304 is filled with certain required level of de-packetized data, the Data Processor 305 reads the de-packetized data from the Input Buffer 305 for further processing. The Data Processor 305 outputs the results of the processing.

Figure 4:
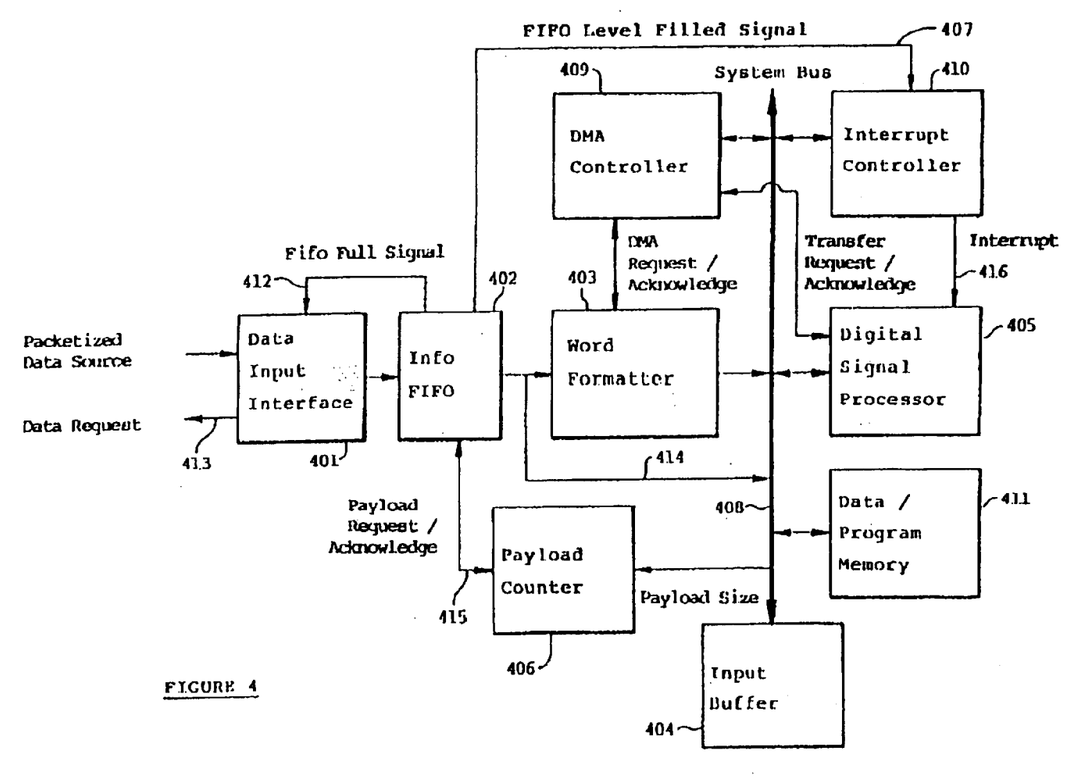
FIG. 4 is a block diagram of an alternate embodiment of the present invention.

FIG. 4 illustrates in more detail an embodiment of a device for de-packetizing and aligning input data according to the present invention. A packetized data source (not shown) is connected to a Data Input Interface 401 which provides necessary signaling for the external packetized data source as well as possible format conversion. For example, the data input interface may be an embodiment of a serial-to-parallel adaptive which converts serial format data such as the I2S format to parallel data. The Data Input Interface 401 is coupled to an Input FIFO 402.

The Input FIFO 402 is a first-in-first-out memory buffer for accumulating input packetized data. A suitable size for the Input FIFO 402 depends on the requirements on process latency and processing bandwidth of the Digital Signal Processor 405. Preferably the Input FIFO 402 has a storage format which is commonly usable by all input packetized data types. For example, the byte format is preferred as most packetized data and payload sizes are specified in unit byte size; in this case, the Data Input Interface 401 provides the necessary conversion of the input packetized data to byte format before storing it into the Input FIFO.

The Input FIFO 402 should contain at least one fullness level detector. This fullness level detector will generate a FIFO Level Filled Signal 407 when the Input FIFO is filled to a level which is equal to and optionally greater than a threshold level defined by the fullness level detector. This threshold level may be pre-defined or programmable. A second fullness level detector may be provided in the Input FIFO 402 for detecting if the Input FIFO is reaching a fullness level which cannot be filled father. This optional second fullness level detector will generate the necessary FIFO Full signal 412 to the Data Input Interface 401 which will in turn adjust a possible Data Request signal 413 to the external packetized data source for stop or start of transmission. Again, the level for fullness detection in the second fullness level detector can be pre-defined or programmable.

It is likely that for most applications the original data such as audio, video, and/or digital multimedia data is packetized and interleaved to form a data stream containing many packets. Before decoding and processing the data stream, it is de-interleaved if necessary and de-packetized. The de-packetization process starts by detecting the sync-word in each packet. This is initiated when the FIFO Level Filled Signal 407 is generated by the Input FIFO 402. The FIFO Level Filled Signal 407 is connected to an Interrupt Controller 410 which generate an Interrupt Signal 416 to the Digital Signal Processor 405. The Interrupt Controller 410 is used for arbitrating and prioritizing other possible signals in the device. In simplified systems, the Interrupt Controller may be removed, and the FIFO Level Filled Signal connected directly to Digital Signal Processor 405.

When the Digital Signal Processor 405 is signalled by the Interrupt Signal 416 generated by the FIFO Level Filled Signal 407, it switches to de-packetization process. In this process, the Digital Signal Processor 405 reads directly from the Input FIFO 402 through path 414 and the system bus 408.

Figure 5:
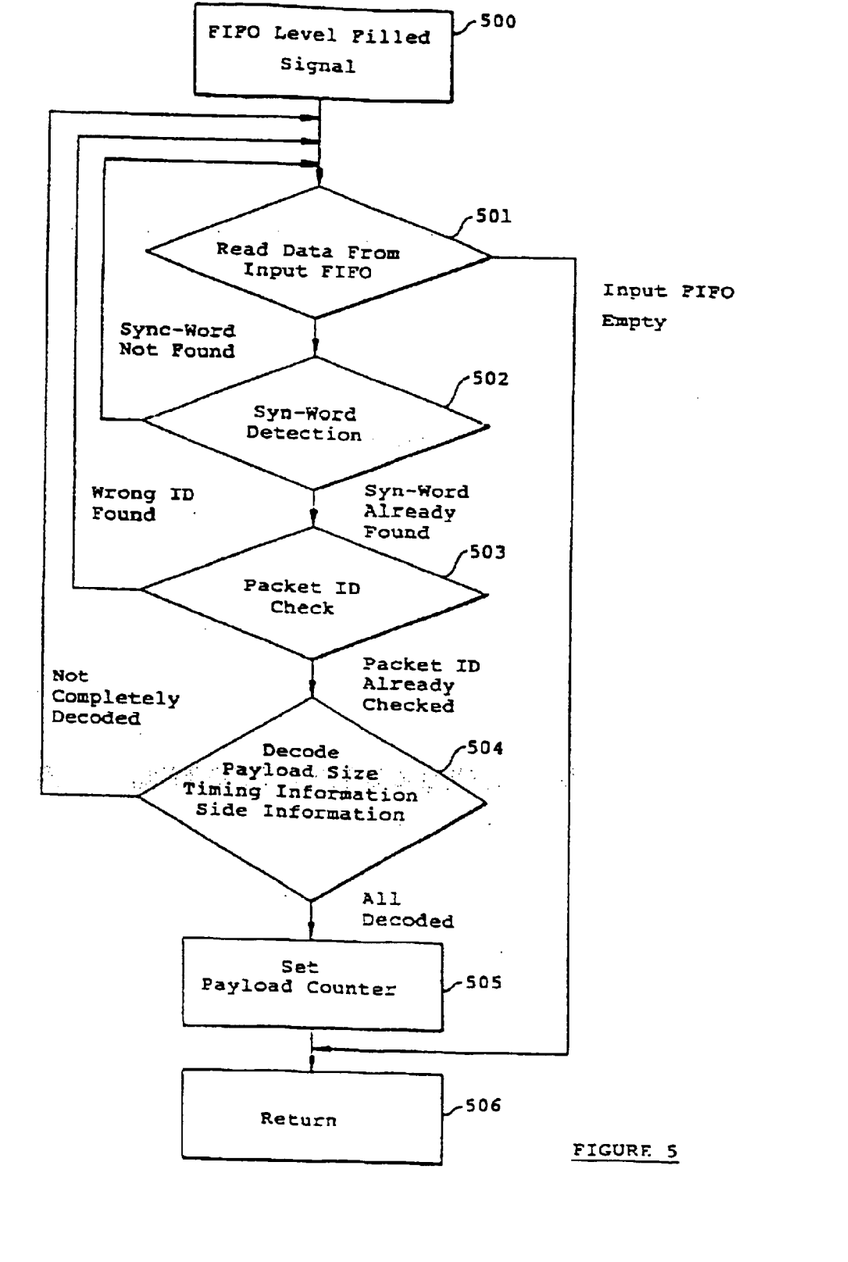
FIG. 5 is a flow chart illustrating an embodiment of part of the de-packetizing process according to the present invention.

An embodiment of the de-packetization process is illustrated in FIG. 5. Basically, on detection of the FIFO level filled signal 500, input packetized data is read, at step 501 and scanned at step 502 for the sync-word. The sync-word is defined based on applications or packet types, and is normally a digital pattern not easily found within the payload. After detection of the sync-word, the process checks at step 503 for the correct packet ID which may be used to differentiate packets from different data sources, types, or versions. Fault detection of the sync-word (emulation of the sync-word within payload data) is also minimized with the packet ID check. If there is wrong ID found, the process is reset to sync-word detection again. After checking the ID, the process executes step 504 at which the correct amount of packetized data is extracted from the Input FIFO for payload size, timing information, and necessary side information Before exiting the de-packetization process (step 506), the Payload Carter (406) is set, at step 505 with payload size which defines the size of the data payload with the current packet.

The Input FIFO 402 may become empty while reading by the Digital Signal Processor 405 in the middle of the de-packetization process. In this case, the Digital Signal Processor exits the de-packetization process and return to its original process. When the FIFO is filled to the threshold level again, the Digital Signal Processor is signalled again and the de-packetization process resumes.

The Payload Counter 406 may include a decrement byte counter which can be set by the Digital Signal Process 405 through the System Bus 408, and some necessary control circuits. When the decrement byte counter is set with the payload size in terms of number of bytes (value greater than zero), a Payload request signal is sent to the Input FIFO 402 through path 415. If the Input FIFO 402 is not empty, the Word Formatter 403 is not full, and the decrement byte counter's value is greater than zero (payload request signal set), one byte will be transferred from the input FIFO 402 to the Word Formatter 403, and the decrement byte counter's value is reduced by one indicated by payload acknowledge signal from Input FIFO 402 through path 415. Hence, the Payload Counter 406 provides the function of moving the exact amount of payload data of each packet from the Input FIFO 402 to the Word Formatter 403.

The Word Formatter 403 aligns the payload data according to the word format of the Digital Signal Processor 405 and moves the aligned payload data to an input Buffer 404. The word format is defined by bit width for a data word handled by the Digital Signal Processor 405. The Input Buffer 404, possible data/program memory 411 for the Digital Signal Processor, and the coupling System Bus 408 are supporting the same word format. For example, if the word format is given at 16-bit, two bytes must be received from the Input FIFO which is byte format memory to form a data word. When a data word is formed, it is transferred to the Input Buffer 404 via the System Bus 408. A DMA Controller 409 may be used to minimize the interruption to the Digital Signal Processor 405 for the transfer. In this case, when a data word is formed in the Word Formatter 403, a DMA request signal is generated to the DMA controller 409 which in turn make a Transfer request signal to the Digital Signal Processor. The Digital Signal Processor acknowledges the request when it releases the System Bus 408. The DMA Controller 409 will then move the data word from the Word Formatter to the Input Buffer through the system bus.

There may be packers with payload which contain a non-integer number of data words; for example, a packet with payload size in an odd number of bytes where the data word format is 16-bit. In this example, the last byte of the packet payload is stored in the word formatter until the first byte of the next packet payload is transferred to the word formatter. Therefore, the Word Formatter 403 provides all necessary data word alignment functions for the packet payload to the Input Buffer 404 to form the final de-packetized data which will be processed by the Digital Signal Processor 405. The Digital Signal Processor 405 may be replaced by any other suitable programmable processor core in other embodiments according to the present invention.

The writing of de-packetized data to the Input Buffer 404 and the reading of it by the Digital Signal Processor 405 can be organized in a circular buffer mode to increase efficiency. In another embodiment of the current invention, it is advantageous to combine the Input Buffer 404 with any Data/Program Memory 411. The present invention does not exclude embodiments with multiple word formatter and input buffers, as it can be easily expanded to handle de-interleaving, de-packetization and alignment of multiple packetized input data.

With the coupling of the payload counter and word formatter with data input interface and input FIFO, the present invention provides a very low cost but efficient implementation for de-packetizing and aligning packetized input data. The payload counter and word formatter combination releases data processing load from the data processor for the system. Its capability of aligning the de-packetized data for the input buffer allows saving of memory size needed for the input buffer and hence saving of implementation cost. The described arrangements of the invention have the ability of sharing the data processing task and the part of the de-packetizing task with the same data processor and therefore provides all needed flexibility in the de-packetizing task.

The described arrangements have been advanced merely by way of explanation any many modifications may be made thereto without departing from the spirit and scope of the invention which includes every novel feature and combination of novel features herein disclosed.

What is claimed is:

1. An apparatus for depacketizing and aligning input data having a packetized format, comprising:
    an input memory for receiving, storing, and output of input data, and for outputting of units of a payload of a data packet of the input data;
    a data input interface through which the input data is transferred to the input memory, said input data interface configured to perform hand shaking with a packetized data source of said input data;
    data processing means for receiving the outputted input data from the input memory and detecting, identifying and determining payload size of the data packet and generating a payload size signal indicative of the size of the payload, and for separately receiving and effecting data processing of the payload;
    a word formatter for receiving said units of said payload outputted from the input memory, gathering and aligning said units to form data words, and for outputting said data words;
    a payload counter for controlling the input memory in accordance with the payload size signal and configured to cause the payload units to be outputted from the input memory to the word formatter; and
    an input buffer for receiving said data words from the word formatter and storing them, and for transferring the data words to the data processing means, to effect separate receiving of said payloads; and processing using the received said data words.

2. The apparatus of claim 1 wherein the input memory has a fullness level detector for generating a level-filled signal when the input data received thereby is such as to fill the input memory to a predetermined level, and said data processing means is responsive to generation of said level-filled signal to execute said receiving the outputted input data from the input memory and detecting, identifying, and determining payload size of the data packet and generating said payload size signal.

3. The apparatus of claim 2, comprising an interrupt controller for receiving said level-filled signal and generating an interrupt signal pursuant to receipt thereof, said processing means arranged for receipt of said interrupt signal and, on receipt thereof, for executing said receiving the outputted input data from the input memory and detecting, identifying and determining payload size of the data packet therein and generating said payload size signal.

4. The apparatus of claim 3 wherein the input memory has a further fullness level detector for generating and directing to said data input interface a further level-filled signal when the input thereto of fresh input data is such as to fill the input memory to a further predetermined level, said data input interface responsive to receipt of said further level-filled signal to generate a data request signal for direction to a packetized data source indicating of a need to modify the data transmission rate of the input data directed to the apparatus from the packetized data source.

5. The apparatus of claim 4 wherein said input memory is a first in first out memory.

6. The apparatus of claim 1 wherein the input memory is controlled whereby said input data comprising said packet is removed from the input memory and replaced by fresh input data, pursuant to the transfer to the data processing means of said data words representing the data packet, the apparatus being arranged for repetitive depacketizing and aligning of data packets and data processing thereof, the data processing means being arranged for repetitively and alternatingly executing a step comprising said receiving the outputted input data from the input memory and detecting, identifying and determining payload size of the data packet therein and generating said payload size signal, and comprising separating receiving and effecting data processing of the payload of the data packet.

7. The apparatus of claim 1 wherein the data processing means includes a digital signal processor, data/program memory, DMA controller and input buffer, each in data communication via a bus.

8. The apparatus of claim 7 wherein the word formatter is arranged for generating a DMA request signal when a said data word is formed thereby, and the DMA controller is responsive to said DMA request signal to generate and direct transfer signal to the digital signal processor, the digital signal processing being responsive to the transfer signal to enable the DMA controller to move the data word from the word formatter to the input buffer for subsequent processing.

9. The apparatus of claim 1 wherein the data processing means is arranged to execute said detecting and identifying the data packet by detection of a sync-word, followed by verification of the packet ID.

10. The apparatus of claim 1 wherein the data processing means, pursuant to said detecting and identifying the data packet, extracts timing information from the input data.

11. The apparatus of claim 1 wherein the data processing means, pursuant to said detecting and identifying the data packet, extracts side information from the input data.

12. A method for depacketizing and aligning input data having a packetized format, comprising:
    receiving and storing the input data in an input memory by transferring input data to the input memory via a data input interface that performs hand shaking with a packetized data source of said input data;
    outputting the stored input data to data processing means;
    by use of the data processing means, detecting, identifying said determining a size of a payload of a data packet of the input data that is outputted thereto;
    by use of the data processing means, generating a payload size signal indicative of the size of the payload;

controlling the input memory in accordance with the payload size signal to cause payload units that form said payload to be outputted from the input memory to a word formatter;

by use of said word formatter, gathering and aligning said payload units outputted thereto to form data words;

outputting said data words from said word formatter to an input buffer and storing them in said input buffer;

transferring said data words to the data processing means; and effecting data processing on the data packet represented by the data words transferred thereto using the transferred data words.

13. The method of claim 12 comprising generating a level-filled signal when the input data received by the input memory is such as to fill the input memory to a predetermined level, and causing said data processing means to effect said detecting, identifying, and determining payload size of the data packet, and to said generate payload size signal, pursuant to generation of the level-filled signal.

14. The method of claim 13, comprising generating an interrupt signal from said level-filled signal and directing said interrupt signal to said data processing means to cause said data processing means to effect said receiving the outputted input data from the input memory and detecting, identifying, and determining payload size of a data packet therein and to generate said payload size signal.

15. The method of claim 13, comprising generating and directing to a data input interface a further level-filled signal when the input thereto of fresh input data is such as to fill the input memory to a further predetermined level, and causing said data input interface to generate, responsive to receipt thereby of said further level-filled signal, a data request signal for direction to a packetized data source, indicative of a need to modify a data transmission rate of the input data directed to the apparatus from the packetized data source.

16. The method of claim 12 wherein the input memory is controlled whereby said input data comprising said data packet is removed from the input memory and replaced by fresh input data pursuant to the transfer of said data words representing that data packet to the data processing means, and compromising receiving the outputted input data from the input memory and detecting, identifying, and determining payload size of the data packet therein and generating said payload size signal indicative of the size of the payload, and comprising effecting data processing of the payload are repetitively and alternatingly executed.

17. The method of claim 16, comprising generating a DMA request signal when a said data word is formed, and applying the DMA request signal to a digital signal processor forming part of said data processing means to cause the digital signal processor to enable a DMA controller to move that data word from the word formatter to an input buffer of the data processing means for subsequent processing.

18. The method of claim 12 wherein said input memory is a first in first out memory.

19. The method of claim 12 wherein the data processing means executes said detecting and identifying the data packet by detection of a sync-word, followed by verification of the packet ID.

20. The method of claim 12 wherein the data processing means extracts timing information from the input data pursuant to said identifying and identifying the data packet.

21. The method of claim 12 wherein the data processing means extracts side information from the input data pursuant to said detecting and identifying the data packet.

22. An apparatus for depacketizing and aligning input data having a packetized format, comprising:

an input memory for receiving, storing, and output of input data, and for outputting of units of a payload of a data packet of the input data;

a data input interface through which the input data is transferred to the input memory, said data input interface configured to perform hand shaking with a packetized data source of said input data;

data processing means for receiving the outputted input data from the input memory and detecting, identifying, and determining payload size of the data packet and generating a payload size signal indicative of the size of the payload, and for separately receiving and effecting data processing of the payload;

a word formatter for receiving said units of said payload outputted from the input memory, gathering and aligning said units to form data words, and outputting said data words;

a payload counter for controlling the input memory in accordance with the payload size signal whereby to cause the payload units to be outputted from the input memory to the word formatter; and means for transferring the data words to the data processing means to effect separate receiving of said payload.

23. A method for depacketizing and aligning input data having a packetized format comprising:

receiving and storing the input data in an input memory by transferring input data to the input memory via a data input interface that performs hand shaking with a packetized data source of said input data;

outputting the stored input data to data processing means;

by use of the data processing means, detecting, identifying the determining the size of a payload of a data packet of the input data outputted thereto;

by use of the data processing means, generating a payload size signal indicative of the size of the payload;

controlling the input memory in accordance with the payload size signal to cause payload units that form said payload to be outputted from the input memory to the word formatter;

by use of said word formatter, gathering and aligning said payload units outputted thereto to form data words;

outputting said data words from said word formatter to an input buffer and storing them in and input buffer;

transferring said data words to the data processing means.

* * * * *

UNITED STATES PATENT AND TRADEMARK OFFICE
CERTIFICATE OF CORRECTION

PATENT NO. : 6,868,091 B1
DATED : March 15, 2005
INVENTOR(S) : Yau Wei Lucas Hui et al.

It is certified that error appears in the above-identified patent and that said Letters Patent is hereby corrected as shown below:

Column 10,
Lines 41-42, "direct transfer" should read -- direct a transfer --.

Column 12,
Line 5, "to said identifying and" should read -- to said detecting and --.
Line 56, "in and input" should read -- in said input --.

Signed and Sealed this

Tenth Day of January, 2006

JON W. DUDAS
*Director of the United States Patent and Trademark Office*